(12) United States Patent
Akarte et al.

(10) Patent No.: US 7,747,987 B1
(45) Date of Patent: Jun. 29, 2010

(54) SYSTEM AND METHOD OF ANALYZING RISK IN RISK-BASED SOFTWARE TESTING

(75) Inventors: Nitin Akarte, Santa Clara, CA (US); Santosh Rajvaidya, Santa Clara, CA (US); Bharathi Raghavan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1240 days.

(21) Appl. No.: 10/913,587

(22) Filed: Aug. 5, 2004

(51) Int. Cl.
*G06F 9/44* (2006.01)
*G06F 11/00* (2006.01)
*G06F 17/18* (2006.01)
*G06F 19/00* (2006.01)

(52) U.S. Cl. .................. 717/131; 717/126; 714/38; 702/179; 702/181

(58) Field of Classification Search ......... 717/124–135; 714/138, 147, 38, 47, 8, 173; 702/179–181
See application file for complete search history.

(56) References Cited

U.S. PATENT DOCUMENTS

| | | | |
|---|---|---|---|
| 5,548,718 A | | 8/1996 | Siegel et al. |
| 5,651,111 A | * | 7/1997 | McKeeman et al. ............ 714/38 |
| 5,655,074 A | | 8/1997 | Rauscher |
| 6,668,340 B1 | * | 12/2003 | Baker et al. .................... 714/38 |
| 6,895,577 B1 | * | 5/2005 | Noble et al. ................. 717/126 |
| 7,197,427 B2 | * | 3/2007 | Noonan et al. .............. 702/179 |
| 2005/0114839 A1 | * | 5/2005 | Blumenthal et al. ......... 717/124 |
| 2006/0010426 A1 | * | 1/2006 | Lewis et al. ................. 717/124 |
| 2006/0224921 A1 | * | 10/2006 | Marimuthu ................... 714/25 |

OTHER PUBLICATIONS

Amland, Stale "Risk-based testing: Risk analysis fundamentals and metrics for software testing including a financial application case study", The Journal of Systems and Software, Dec. 1999.*
Adrion et al., "Validation, Verification, and Testing of Computer Software"; Computer Surveys, vol. 14, No. 2, Jun. 1982, ACM, 34 pgs.*
Bach, James, "The Challenge of 'Good Enough' Software", 1995, 11pgs; available at http://www.satisfice.com/articles/gooden2.pdf.*
Chillarege Press, by Yanping Chen and Robert L. Probert (University of Ottawa, Ontario, Canada), "A Risk-based Regression Test Selection Strategy", Copyright © 2003, 2 pages.

* cited by examiner

*Primary Examiner*—Wei Y Zhen
*Assistant Examiner*—Ryan D Coyer
(74) *Attorney, Agent, or Firm*—Trellis IP Law Group, PC

(57) ABSTRACT

A system and a method are provided to quantitatively analyze the risk for a risk-based testing of software having at least one module. The risk-based testing comprises obtaining behavior of each module to a set of test cases. The method to quantitatively analyze the risk comprises assigning a confidence weight to each test case for each module based on its test history, assigning a confidence weight to each of a plurality of software specific parameters for each module, calculating a raw confidence level for each module based on the assigned confidence weights to the test cases, and calculating a confidence quotient for each module as a weighted sum of the raw confidence level for each module and the confidence weight for each software specific parameter. The confidence quotient indicates the risk of defects in each module. The module with the smallest confidence quotient is assigned the highest priority during the testing of the software.

11 Claims, 4 Drawing Sheets

| Test Case | 1st Test Cycle | 2nd Test Cycle | Confidence Weight |
|---|---|---|---|
| T1 | P | P | 100 |
| T2 | P | F | 0 |
| T3 | F | P | 50 |
| T4 | F | F | 0 |
| T5 | P | N/A | 100 |
| T6 | F | N/A | 0 |
| T7 | N/A | P | 100 |
| T8 | N/A | F | 0 |

FIG. 3

SYSTEM AND METHOD OF ANALYZING RISK IN RISK-BASED SOFTWARE TESTING

BACKGROUND OF THE INVENTION

1. Field of Invention

The present invention relates in general to the field of software testing. More specifically, embodiments of the present invention relate to system and method for quantitatively analyzing risk in risk-based software testing.

2. Description of the Background Art

A software product comprises several modules, each of which is different in terms of usability, architectural importance and code complexity. Conventionally, software testing is carried out with equal emphasis on all the modules/features of software. This method of testing leaves many defects undetected in modules that are relatively more important for the working of the software. Further, the testing cycle for software testing is stretched since time is needlessly spent on testing the modules where the probability of finding a defect is low. This practice not only results in a lower quality of software products but also reduces the productivity of testing resources.

The problems mentioned above are addressed by following the approach of 'risk-based testing' rather than that of 'test everything with equal emphasis'. The aim of risk-based testing is to organize a test in such a way that the most important defects (i.e., the defects that severely affect the working of the software) are found with a certain extent of reliability. Further, the defects are desirably found in an early stage of testing. Risk-based testing involves identification of the relevant data, to assess the risky modules for possible chances of failure and damage. Based on the assessment, a test strategy is devised, so that the probability of identifying the most important defects is greatly enhanced.

In conventional risk-based testing techniques, the risk of finding defects in every module is qualitatively computed, not quantitatively computed. There are few drawbacks associated with conventional risk-based testing methods. In particular, conventional risk-based testing techniques do not take into account the characteristics of modules, indicating their relative importance, within the software. Consequently, the modules, which are more critical to achieve the desire output from the software, may not be given a higher priority during the testing, thereby reducing the probability of identifying defects in general and catastrophic defects in particular. Secondly, conventional risk-based testing does not account for the introduction of new modules in the software. In particular, there is no provision to determine the risk in case a new module is introduced at an architecturally important position in the new testing cycle of the software. As a result, risk-based testing may not identify this new module as a risky module, although it is a relatively new module, and hence unstable.

SUMMARY OF EMBODIMENTS OF THE INVENTION

Embodiments of the present invention provide a system for quantitatively analyzing the risk in testing software comprising at least one module. Testing comprises obtaining the behavior of each module to each of a set of test cases. Computation of risk may be based on the empirical data from test execution of each module. For various embodiments of the present invention, the system comprises a module for assigning a confidence weight to each test case for each module based on its test history, and a module for assigning a confidence weight to each of software specific parameters. The system may additionally comprise a module for calculating a raw confidence level for each module (e.g., software module) based on the assigned confidence weight, and a module for calculating a confidence quotient of each module (e.g., software module) as a weighted sum of the raw confidence level of each module (e.g., software module) and the confidence weight of each software specific parameter. The confidence quotient indicates the risk for defects in each module. The system may further additionally comprise a module for prioritizing the modules (e.g. the software modules), based on the computed confidence quotient for the modules (e.g., the software modules). The test history indicates the behavior of each module (e.g., each software module) to each of the test cases for at least one test cycle. The software specific parameters indicate the relative weight of each module in the software.

Embodiments of the present invention further provide a method for risk-based testing of software having at least one module. The method comprises identifying a set of test cases for testing, generating a confidence quotient of each module based on test history and at least one software specific parameters, prioritizing the modules based on the generated confidence quotient of the modules, and testing the modules according to the generated priority.

Embodiments of the present invention also further provide a method for quantitatively analyzing risk for a risk-based testing of software having at least one module. The testing comprises obtaining the behavior of each module to a set of test cases. The method for analyzing risk comprises assigning a confidence weight to each test case for each module based on its test history, assigning a confidence weight to each of a plurality of software specific parameters for each module, calculating a raw confidence level for each module based on the confidence weights assigned to the test cases, and calculating a confidence quotient of each module as a weighted sum of the raw confidence level for each module and the confidence weight for each software specific parameter. The confidence quotient indicates the risk for defects in each module. The module with the smallest confidence quotient is assigned the highest priority during the testing of the software.

These provisions, together with the various ancillary provisions and features which will become apparent to those artisans possessing skill in the art as the following description proceeds are attained by devices, assemblies, systems and methods of embodiments of the present invention, the various embodiments thereof being shown with reference to the accompanying drawings, by way of example only, wherein:

BRIEF DESCRIPTION OF THE DRAWINGS

FIG. 3 is a table illustrating test cases, the behavior of the module under consideration over two test cycles and the confidence weights assigned to the test cases.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for the purposes of embodiments of the present invention may include any processor-containing device, such as a mainframe computer, personal computer, laptop, notebook, microcomputer, server, personal data manager or "PIM" (also referred to as a personal information manager) smart cellular or other phone, so-called smart card, set-top box, or any of the like. A "computer program" may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Figure 1:
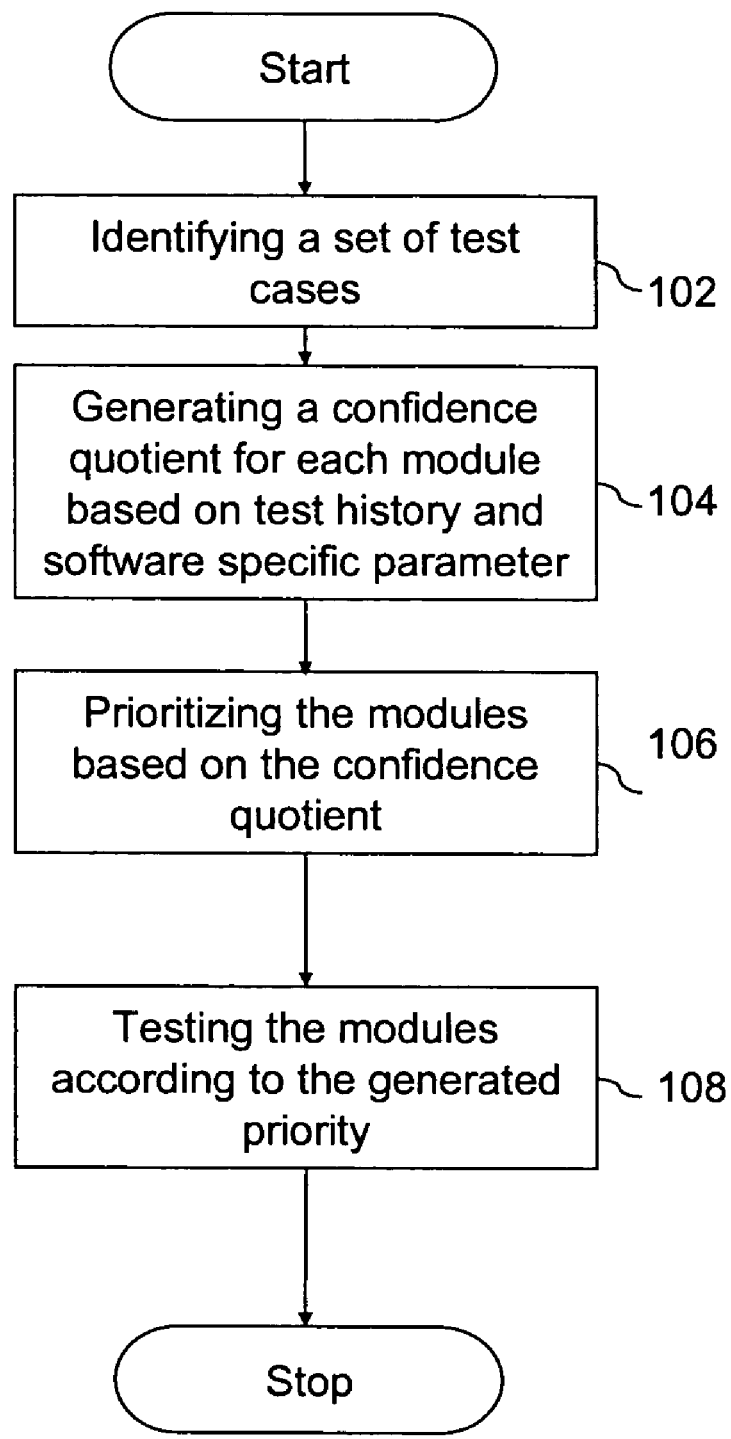
FIG. 1 is a flowchart illustrating a method for analyzing risk in risk-based testing of software in an exemplary embodiment of the present invention.

FIG. 1 is a flowchart illustrating a method for risk base testing of software, in accordance with an exemplary embodiment of the invention. In step 102, a set of test cases for assessing the modules of the software is identified. Each of the test cases is used as an input to the software, and the generated output can be used to identify whether the various modules of the software are performing as expected. In step 104, a confidence quotient is generated for each module. This confidence quotient is computed by using the test history and software specific parameters, such as by way of example only, a usability parameter, a stability parameter and an interaction parameter associated with each module. The confidence quotient indicates the risk associated with each module (e.g., the risk of finding defects in each module). Based on the confidence quotients, the modules are prioritized in step 106 (e.g., the testing of the modules is prioritized). The modules with a higher confidence quotient have a smaller probability for defects, while the modules with smaller confidence quotients have a larger probability of defects. Consequently, the modules with smaller confidence quotient are given higher priority, as compared to modules with a higher confidence quotient. Subsequently, in step 108, the modules are tested, based on the generated priority.

Figure 2:
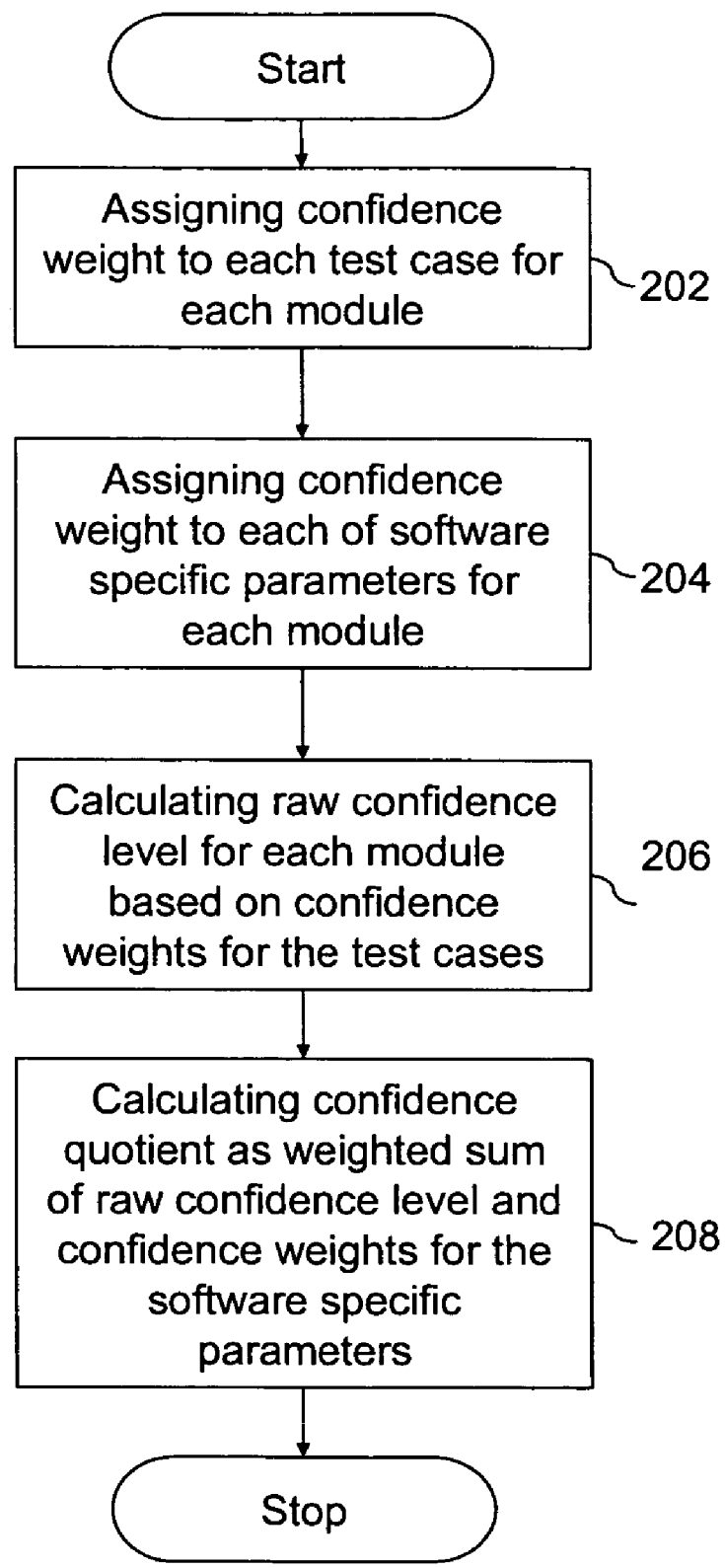
FIG. 2 is a flowchart illustrating steps to compute confidence quotient of a module under consideration.

FIG. 2 is a flowchart depicting the steps to be performed in calculating the confidence quotient for the modules, in accordance with step 104 of FIG. 1. In step 202, a confidence weight is assigned to each test case for each module, based on the test history. The test history comprises the behavior of the module under consideration over several test cycles, when a test case is used as the input to the module. If the module yields the correct result in response to a test case, the confidence weight associated with the test case for the module is higher than the case when the module yields a false result. In step 204, a confidence weight is assigned to each of the software specific parameters for each module. Software specific parameters, by way of example only, include parameters that indicate the interaction parameter, the usability parameter, and the stability parameter of a module. In step 206, a raw confidence level for each module is computed, based on the confidence weights for the test cases. In an embodiment, the raw confidence level is computed as a weighted average of the assigned confidence weights for the test cases relevant to the module. It is to be understood that step 206 may be performed before step 204. In step 208, the confidence quotient for each module is computed as a weighted sum of the raw confidence level and the confidence weight assigned to each of the software specific parameters of the module.

The step of assignment of confidence weights to the test cases, in accordance with step 202 of FIG. 2 may be further described with reference to FIG. 3. FIG. 3 illustrates a table containing a set of test cases (i.e., T1 through T8), the results (i.e., either "P" representing a pass, or "F" representing a fail) for two test cycles referred as first and second test cycles, and the assigned confidence weight. The test cases T1 through T8 illustrate eight possible scenarios with the results of two test cycles. For example, if test case T1 is applied to a module, then in the first as well as the second test cycle the module yields the desired output. Hence, the confidence weight assigned is 100 corresponding to 100% confidence in the test case. If test case T2 is applied to the module, then in the first test cycle the module yields the desired output while the output in the second test cycle is false. Consequently, the confidence weight assigned to T2 is zero (0) since the most recent test cycle (i.e., the second test cycle) yields a false result. In the case of test case T3, the confidence weight is 50 since the result in first test cycle is false, while that in the second test cycle, the most recent test cycle, is true. A confidence weight of 50 corresponds to a 50% confidence in test case T2. Similarly, confidence weights are assigned to the remaining test cases. It is to be noted that N/A represents an untested scenario in a given test cycle. The overall confidence weight, in accordance with step 206 of FIG. 2, is then computed as the average of the confidence weights for the eight scenarios, i.e., the confidence weight=(c1+c2 . . . +c8)/8.

Alternatively, for various embodiments of the invention, the raw confidence level is computed by the following formula:

Raw confidence level (RCL)={[Number of test cases passed in both the first and the second test cycle*100]+[Number of test cases failed in the first but passed in the second test cycle*50]}/ Total number of test cases It is to be noted that the weights in the above formula, i.e., 100 and 50, are for illustration purposes only. The selection of weights depends on factors, such as test history.

The confidence quotient for the module is computed by using the following formula:

Confidence Quotient=RCL*Interaction parameter+ [Usability parameter+Stability parameter], wherein the Interaction parameter fall in the range [0.5, 1.0], the usability parameter lies in the range [−5, 5], the stability parameter lies in the range [−5, 5].

The interaction parameter indicates the interaction of the module under consideration with the remaining modules of the software. The interaction can be with internal modules and/or external applications. The assigned value of the interaction parameter is inversely proportional to the amount of interaction. The greater the interaction, the lower the interaction parameter.

The usability parameter is defined as the usability of the module under consideration to the end-user. This parameter is used to define a module that is not a core module architecturally but is important for end-user operations. For example, user interface modules are important modules from the usability point of view, though they are located at the boundary of the architecture of the software. The assigned value of the usability parameter is inversely proportional to the impact of the module on the end user. The greater the impact on the end user, the greater is the risk, and hence, more testing is required.

The stability parameter of the module under consideration is determined by the age and the historical data relating to the module. For example, a module that is present in the software from the first version, and is stable since being established, and is well tested, is a stable module. On the other hand, a relatively new or customized module for a specific version is less stable. The assigned value of the stability parameter is directly proportional to the stability of the module.

It is to be noted that software specific parameters other than the interaction parameter, the usability parameter and the stability parameter can also be used. It is to be noted that the range of values of the interaction parameter, the usability parameter and the stability parameter is for the purpose of illustration only. The range of values is determined on the basis of the amount of risk each parameter poses to a software application. The range of values is proportional to the amount of risk associated.

Figure 4:
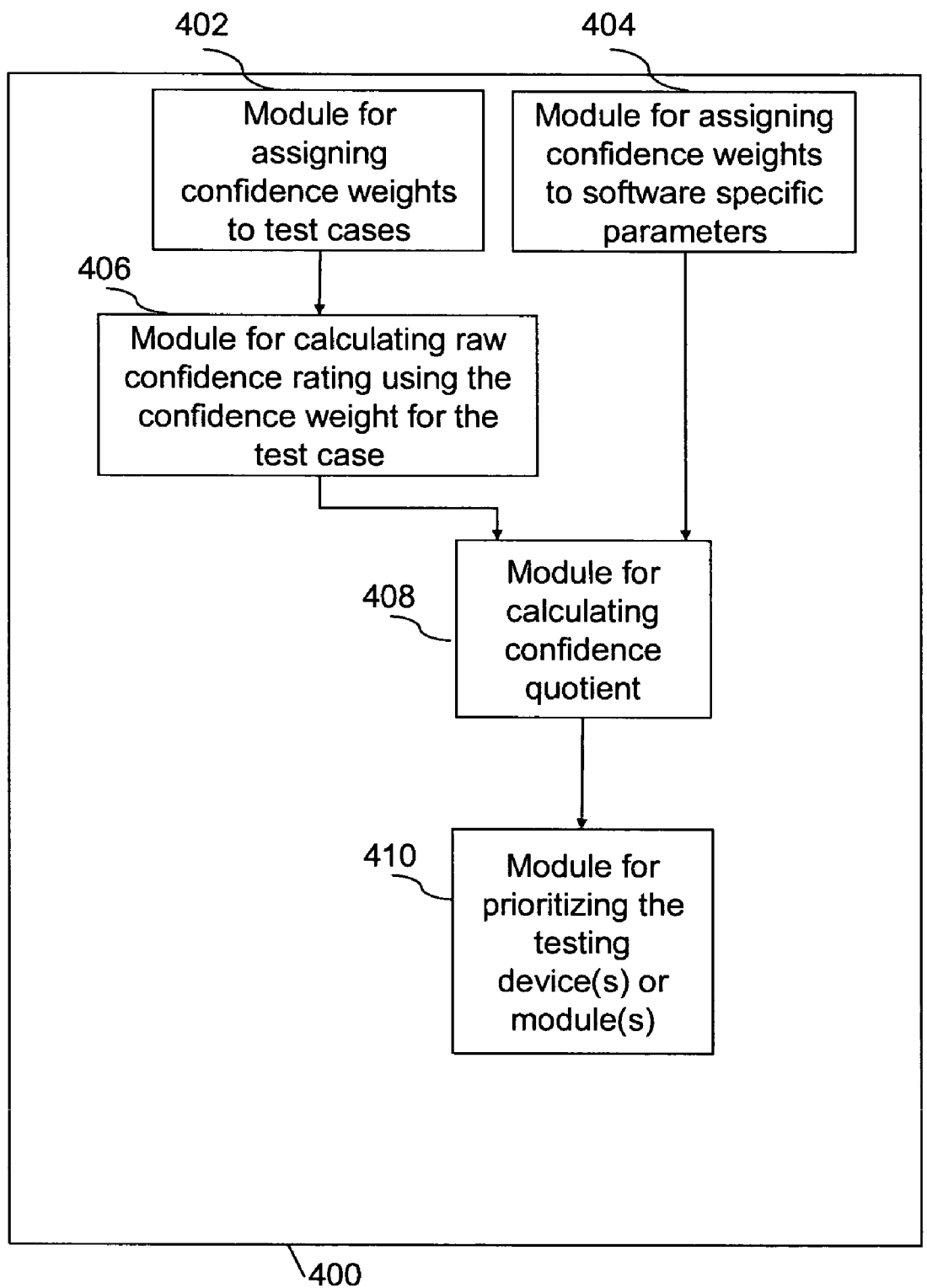
FIG. 4 illustrates a system for analyzing risk in risk-based testing of software.

FIG. 4 illustrates an exemplary computing system that can conduct or operate one or more procedures in accordance with the various embodiments of the present invention. In particular, the system is capable of analyzing risk in the risk-based testing of software. System 400 comprises a module 402 for assigning confidence weights to test cases, a module 404 for assigning confidence weights to software specific parameters, a module 406 for calculating raw confidence level or rating, a module 408 for calculating confidence quotient, and a module 410 for prioritizing testing device(s) or modules. Module 402 for assigning confidence weights to test cases assigns a confidence weight, based on the behavior of the module to each test case over several previous test cycles. Module 404 for assigning confidence weights for software specific parameters assigns a confidence weight, based on the relative importance of the module in terms of parameters such as the usability, stability and the interaction factor for the module. Module 406 for calculating raw confidence level or rating receives the confidence weights for the test cases from module 402 for assigning confidence weights and computes the raw confidence level for the module under consideration. Subsequently, module 408 for calculating confidence quotient computes the confidence quotient for the module under consideration using the raw confidence level or rating produced by module 406, and the assigned confidence weights to the software specific parameter from module 404 for the module under consideration. Once the confidence quotient for all the modules has been computed, a priority list of the modules is generated by module 410 for prioritizing modules. The modules with lower confidence quotients are given higher priority during the testing of the software.

In an embodiment, system 400 and its components are implemented in hardware, software or some combination by one or more computing systems consistent therewith, unless otherwise indicated. In another embodiment, system 400 and its components comprise a processor, and memory to store program instructions for implementing the method described in FIGS. 1 and 2. The processor includes one or more general or special purpose processors, such as a Pentium®, Centrino®, Power PC®, digital signal processor ("DSP"), and so on. The memory includes hard disk variants, floppy/compact disk variants, digital versatile disk ("DVD") variants, smart cards, partially or fully hardened removable media, read only memory, random access memory, cache memory, and so on, in accordance with the requirements of a particular application. Various programming languages or other tools can also be utilized, such as those compatible with C variants (e.g., C++, C#), the Java 2 Platform, Enterprise Edition ("J2EE") or other programming languages in accordance with the requirements of a particular application. Such working memory components can, for example, include one or more of applications, add-ons, applets, custom software and so on for conducting but not limiting itself to the examples discussed elsewhere herein.

Embodiments of the present invention have the advantage that both test history, as well as the software specific parameters, are used to identify the risky modules, i.e., the modules wherein the probability of finding defects are higher. Secondly, the test case results, either pass or fail, are used rather than the defects record. The test case record over several cycles indicates the relative stability of a module over a period of time, which leads to a more effective analysis of risky modules.

Reference throughout this specification to "one embodiment", "an embodiment", or "a specific embodiment" module that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for quantitatively analyzing risk for a risk-based testing of software having at least one module, the method comprising:

assigning, for a set of test cases, a first confidence weight to each test case for each module based on its test history, the first confidence weight determined based on performance of a module in the set of test cases for at least one test cycle;

determining an interaction value for an interaction parameter, the interaction parameter indicating the interaction of a module with remaining modules of the software;

determining a usability value for a usability parameter, the usability parameter measuring an importance of the module for end-user operations;

assigning a second confidence weight to each of a plurality of software specific parameter values for each module including the interaction value and the usability value for each module, the second confidence weight being a relative importance for the plurality of software specific parameter values to a module in the software;

calculating, by a computing device, a raw confidence level for each module based on the assigned first confidence weight to each test case of each module; and calculating, by the computing device, a confidence quotient for each module by a formula that uses the raw confidence level and each software specific parameter value weighted by the second confidence weight for the module to calculate the confidence quotient, the confidence quotient for each module indicating the risk for defects in each module, wherein the confidence quotient is calculated by multiplying the raw confidence level by the interaction parameter in the software specific parameters to generate a first result, adding the usability parameter in the software specific parameters with a stability parameter to generate a second result, wherein the confidence quotient is calculated by adding the first result and the second result.

2. The method according to claim 1 further comprising prioritizing the modules based on the computed confidence quotient for the modules.

3. The method according to claim 1, wherein the software specific parameter comprises a stability parameter for the module, the stability parameter indicating the stability of the module based on an age of the module, the age indicating how long the module has been included in the software and the age being used to determine the confidence weight for the module.

4. The method according to claim 1, wherein the raw confidence level for each module comprises the weighted average of the confidence weight assigned to each of the test cases for the module.

5. A system for quantitatively analyzing risk in testing a software having at least one module, the system comprising:

a computer; and a machine-readable storage medium including instructions executable by the computer, the storage medium comprising:

one or more instructions for assigning, for a set of test cases, a first confidence weight to each test case for each module based on its test history, the first confidence weight determined based on performance of a module in the set of test cases for at least one test cycle;

one or more instructions for determining an interaction value for an interaction parameter, the interaction parameter indicating the interaction of a module with remaining modules of the software;

one or more instructions for determining a usability value for a usability parameter, the usability parameter measuring an importance of the module for end-user operations;

one or more instructions for assigning a second confidence weight to each of a plurality of software specific parameter values for each module including the interaction value and the usability value for each module, the second confidence weight being a relative importance for the plurality of software specific parameter values to a module in the software;

one or more instructions for calculating, by the computer, a raw confidence level for each module based on the assigned first confidence weight to each test case of each module;

one or more instructions for calculating, by the computer, a confidence quotient for each module by a formula that uses the raw confidence level and each software specific parameter value weighted by the second confidence weight for the module to calculate the confidence quotient, the confidence quotient for each module indicating the risk for defects in each module, wherein the confidence quotient is calculated by multiplying the raw confidence level by the interaction parameter in the software specific parameters to generate a first result, adding the usability parameter in the software specific parameters with a stability parameter to generate a second result, wherein the confidence quotient is calculated by adding the first result and the second result; and one or more instructions for prioritizing the modules based on the computed confidence quotient for the modules.

6. A machine-readable storage medium including instructions executable by a computer, the storage medium comprising:

one or more instructions for assigning, for a set of test cases, a first confidence weight to each test case for each module based on its test history, the first confidence weight determined based on performance of a module in the set of test cases for at least one test cycle;

one or more instructions for determining an interaction value for an interaction parameter, the interaction parameter indicating the interaction of a module with remaining modules of the software;

one or more instructions for determining a usability value for a usability parameter, the usability parameter measuring an importance of the module for end-user operations;

one or more instructions for assigning a second confidence weight to each of a plurality of software specific parameter values for each module including the interaction value and the usability value for each module, the second confidence weight being a relative importance for the plurality of software specific parameter values to a module in the software;

one or more instructions for calculating, by the computer, a raw confidence level for each module based on the assigned first confidence weight to each test case of each module;

one or more instructions for calculating, by the computer, a confidence quotient for each module by a formula that uses the raw confidence level and each software specific parameter value weighted by the second confidence weight for the module to calculate the confidence quotient, the confidence quotient for each module indicating the risk for defects in each module, wherein the confidence quotient is calculated by multiplying the raw confidence level by the interaction parameter in the software specific parameters to generate a first result, adding the usability parameter in the software specific parameters with a stability parameter to generate a second result, wherein the confidence quotient is calculated by adding the first result and the second result; and one or more instructions for prioritizing the modules based on the computed confidence quotient for the modules.

7. The method of claim 1, wherein the second confidence weight for the usability parameter is proportional to the input of the module on the end-user.

8. The system according to claim 5, wherein the software specific parameter value comprises a stability parameter for the module, the stability parameter indicating the stability of the module based on an age of the module, the age indicating how long the module has been included in the software and the age being used to determine the confidence weight for the module.

9. The system according to claim 5, wherein the raw confidence level for each module comprises the weighted average of the first confidence weight assigned to each of the test cases for the module.

10. The system according to claim 6, wherein the software specific parameter value comprises a stability parameter for the module, the stability parameter indicating the stability of the module based on an age of the module, the age indicating how long the module has been included in the software and the age being used to determine the confidence weight for the module.

11. The system according to claim 6, wherein the raw confidence level for each module comprises the weighted average of the first confidence weight assigned to each of the test cases for the module.

* * * * *